Dec. 22, 1931.    F. L. O. WADSWORTH    1,838,067
ROTARY DRILLING TOOL
Original Filed March 10, 1921
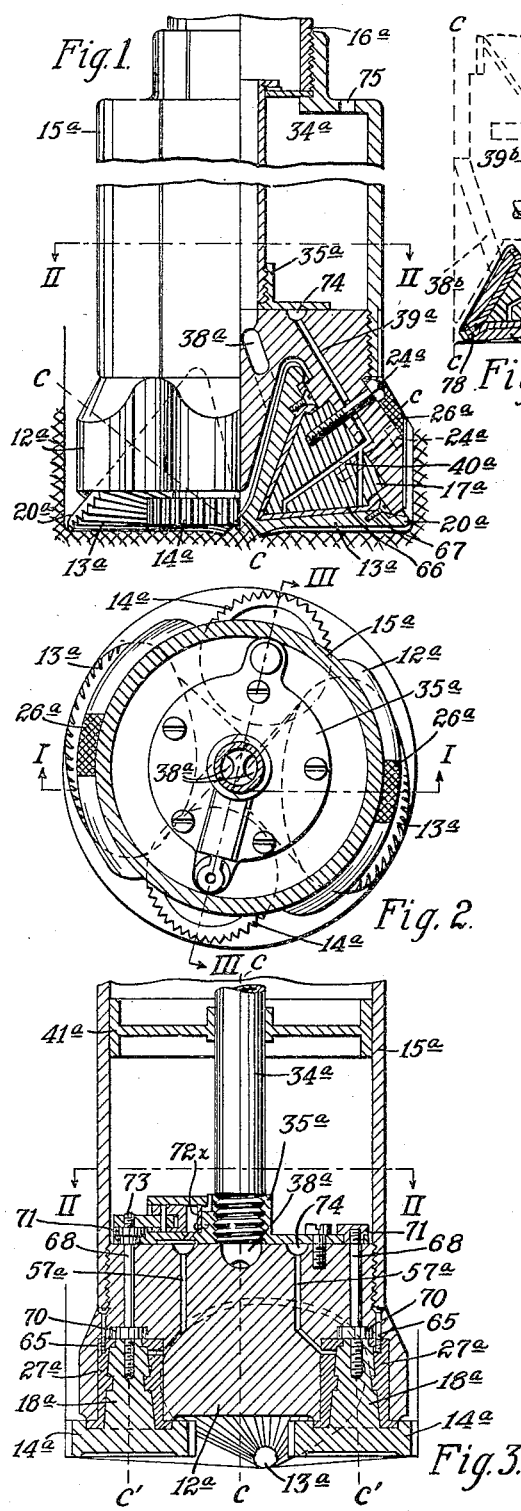
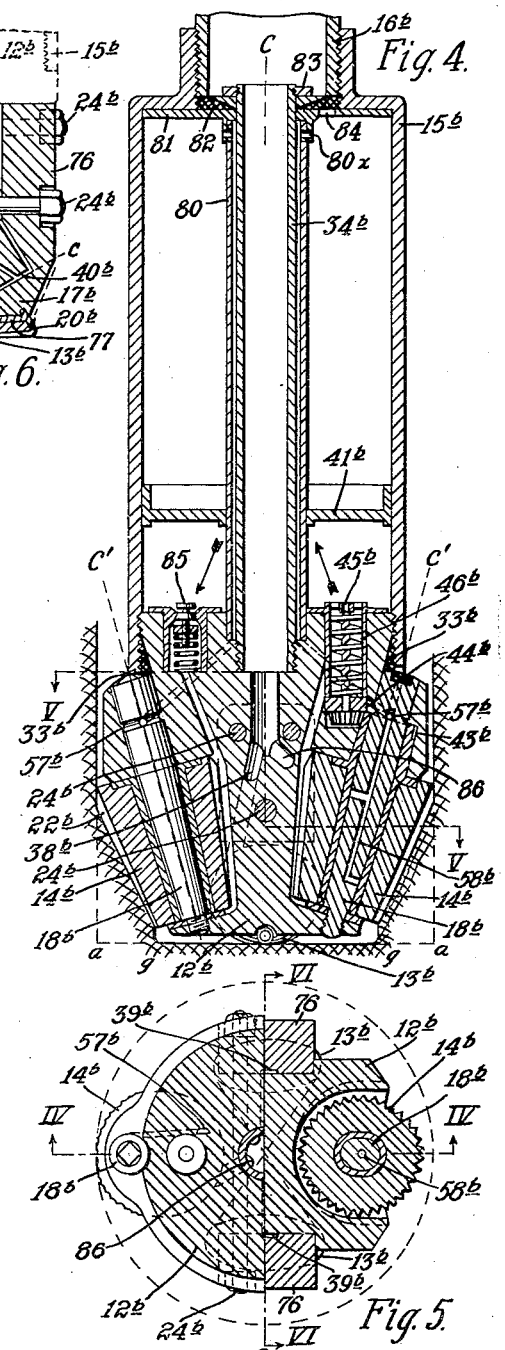
INVENTOR
Frank L. O. Wadsworth
BY Green & McAllister
HIS ATTORNEYS Patented Dec. 22, 1931

1,838,067

UNITED STATES PATENT OFFICE

FRANK L. O. WADSWORTH, OF PITTSBURGH, PENNSYLVANIA

ROTARY DRILLING TOOL

Original application filed March 10, 1921, Serial No. 451,223. Divided and this application filed May 5, 1927. Serial No. 188,926.

This invention relates in general to rotary boring tools which utilize a plurality of revolvable cutters to perform the drilling operation, and has for an object the provision of a means for continuously lubricating the bearings of the cutter members, which is actuated and controlled by the movement of those members, and is in no way affected by the pressure, or the rate of flow, of the liquid that is used in flushing out and carrying away the excavated material. One of the advantages of this feature of improvement is that the rate of feed of the lubricant may be preadjusted to the rate of movement of the revolving cutters, and this predetermined ratio may be automatically maintained under all conditions of operation. This application is a division of my copending application Serial No. 451,223, filed March 10, 1921.

Other objects and advantages of my invention will be developed more fully by the consideration of the three illustrative embodiments thereof, which are shown in the accompanying drawings; in which:

Figure 1 is a partial side elevation of a drill head, the lower part of which is shown in half section on the plane I—I of Fig. 2, while the upper portion is correspondingly sectional on the central plane $6^c$—$6^c$ of that figure. Fig. 2 is a sectional plan view on the plane II—II of Figs. 1 and 3. Fig. 3 is a longitudinal section, partly in elevation, on the plane III—III of Fig. 2. Fig. 4 is a longitudinal central section—as on the plane IV—IV of Fig. 5—of a second illustrative form of my improved boring tool. Fig. 5 is a sectional view on the two plane level V—V of Fig. 4. Fig. 6 is a sectional elevation on the plane VI—VI of Fig. 5.

In the construction shown in Figs. 1, 2 and 3, the head of the tool is made in two sections; —a lower section $12^a$, which carries the four complementary cutter members $13^a$—$13^a$, $14^a$—$14^a$; and an upper tubular section $15^a$, which is screwed thereon, and which is threaded at its top to receive the end of the driving drill stem $16^a$. The cutters $13^a$ are revolvably mounted on inwardly inclined stud shafts $17^a$, which are symmetrically offset with respect to the longitudinal axis C—C of the drill head; and the cutters $14^a$—$14^a$ are secured to, or are integral with, vertically disposed shafts $18^a$, $18^a$ which are journaled in the split bushings $27^a$, $27^a$ that are detachably secured in the head by the screws 65, 65, etc. The cutters $13^a$ are held in position on the coned stud shafts $17^a$ by means of the split flanged bushings 66, that are clamped to the cutters by the screws 67; and the stud shafts themselves are rigidly locked in their supporting sockets on the head by the screws $24^a$—$24^a$, the heads of which are preferably covered with fusible metal seals $26^a$, $26^a$. Each of the vertical cutter shafts $18^a$ is also provided with an extension shaft 68, which has an enlarged head 70 that engages the top of the split bushings $27^a$, and which carries, at its upper end, a screw collar 71 that co-operates with the parts $27^a$ and 70 in preventing any accidental removal of the cutter member $14^a$—$18^a$.

Each of the offset cutters $13^a$ is preferably of hyper-conoidic form, and is provided with an elliptically rounded end rib, $20^a$. These rounded ends engage with the boundary zone between the bottom and the completed side wall of the bore hole; but in this case the said engagement is confined to a very narrow annulus by the inward inclination of the axes and end surfaces of the rolling cutters. The duty imposed on the tooth elements of the ribs 20 is therefore relatively light even when no complementary cutters are employed; but for the purpose of relieving these tooth elements of substantially all shearing action, I arrange the vertical spindle cutters, $14^a$, in such relationship to the head that the peripheral teeth thereon roll on the parallel sides of the bore cavity and cut away the material from the path of the rotating and revolving edges $20^a$, $20^a$. The latter then serve only as guard elements, or as auxiliary supplemental elements, that may co-operate with the lower edge portions of the toothed cutters $14^a$, when the latter become somewhat worn, or when they encounter extremely hard strata of material.

This exemplification of my invention is also provided with devices which are adapted to feed a continuous supply of lubricant to the bearings of the revolving cutters, and which are automatically actuated and controlled by the cutter movement itself. In the form here shown this automatic feeding means comprises a small short stroke plunger pump 72 the piston of which is actuated by an eccentric pin 73 in one extension shaft collar 71. The action of the pump draws oil through a flap valve controlled port $72^x$ from the lower portion of the annular lubricant chamber—which is formed by the upper section $15^a$ of the head and the central water tube conduit $34^a$—and forces it into an annular groove, 74, that is covered by the flanged collar $35^a$ at the lower end of the said tube $34^a$. The annular passage way 74 is in communication with the journal bearings of the hyperconoidic rolling cutters $13^a$ through the ducts $39^a$—$40^a$ (see Fig. 1); and is also connected with the bearing surfaces of the shafts $16^a$ by means of the passage ways $57^a$, $57^a$ (see Fig. 3); and the oil which is pumped into the covered groove is therefore uniformly distributed to the various cutter bearings at a rate which is determined by the relative areas of the different ducts and the angular velocity of the revolving members.

The upper surface of the mass of lubricant in the annular reservoir is covered and protected by a light piston member $41^a$, which gradually descends as the oil is pumped out from the bottom of the chamber. In this construction the space above the descending piston is in open communication with the fluid which surrounds the drill head through the opening, or openings, 75. The hydrostatic pressure on the opposite ends of the lubricant column is thus normally balanced; and the action of the oil feed pump 72 is, therefore, not affected by changes, either in the absolute pressures, or in the differential pressures, of the flushing liquid inside and outside the drill stem.

The flushing liquid is carried down through the central tube $34^a$, and is directed tangentially downward, on the rearward and upwardly moving sides of the rolling cutters $13^a$—$13^a$, through the inclined passage ways $38^a$—$38^a$. This arrangement results in the discharge of the streams of liquid at the points where their velocities are greatest with respect to the cutter surfaces on which they impinge; and thus effects a rapid and effective cleaning of the tooth elements of the skew rolling bits as they leave the material on which they are operating. The utilization of this feature of my improved construction is particularly advantageous in the case of such an organization as that last described, in which the greater part of the drilling operation is performed by two offset hyper-conoidic cutting rollers that remove the material from the bottom of the bore hole by a combined curtate-cycloidic chipping action and a side wedging or end thrust movement of their skew tooth elements; and in which there is, therefore, a tendency to wedge a considerable amount of loose material into the grooves of the toothed surfaces.

Figs. 4, 5 and 6 illustrates another embodiment of my present invention, in which the drill head is, as before, preferably constructed in two sections $12^b$ and $15^b$, that are detachably locked together by a screw joint, and are adapted to be secured to the lower end of the threaded drill stem $16^b$ in the usual manner. The lower section $12^b$ carries two coned cutter rollers, $13^b$—$13^b$, that are mounted on inclined stud pins $17^b$, each of which is preferably made integral with a block 76 (as shown in detail in Fig. 6). These cone cutters are revolvably secured on their stud pin supports by means of the split flanged bushings 77, that are held in place in the hub of the cutters by clamp screws 78; and the block supports 76—76 are rigidly clamped in milled grooves on the opposite sides of the head by the cross bolts $24^b$—$24^b$. The member $12^b$ also carries two complementary side cutting rollers $14^b$—$14^b$, which are journalled on shafts $18^b$—$18^b$ that are inclined at a small angle to the longitudinal axis C—C of the drill. The side cutters, $14^b$ are housed and shrouded in suitable pockets on the periphery of the head (intermediate the milled grooves that receive the cutter block supports 76); and the lower shouldered ends of the tapered journal shafts $18^b$ are threaded into the end walls of these pockets. The upper cylindrical portions of the shafts are fitted closely in reamed holes which hold them rigidly against lateral displacement; and the assembled parts are locked in position both by the lower edge of the upper section $15^b$—which partly covers the ends of the shaft members $18^b$—and also, if desired, by fusible metal seals $33^b$—$33^b$.

The complemental action of the two pair of rolling cutter bits, $13^b$—$13^b$ and $14^b$—$14^b$ is essentially the same as that which characterizes the previously considered exemplifications of my invention. The teeth on the sides of the rolling cone members $13^b$ act on the material at the center of the bore hole and cut a flat bottomed cavity whose diameter, $g$—$g$, is, in this case, about 70% of the finished diameter $a$—$a$ of the hole, and whose area is therefore about 50% of the completed section. The remainder of the material is removed from the annular zone, $a$—$g$, by the curtate-cycloidal action of the projecting tooth elements on the rolling surfaces of the spindle cutters $14^b$—$14^b$. The lower extremities of these elements overlap the zone of action covered by the roller bits $13^b$; and the upper ends thereof are beveled off, as at $22^b$, to make an extended contact with the finished side wall of the bore hole; thus eliminating any sharp edges, or peripheral lines of rapid wear, on the cutting surfaces, and ensuring the efficient operation, and the effective maintenance of the gauge diameter, of the tool for long continued periods of drilling in hard rock formation.

The organization shown in Figs. 4 and 5 is provided with a force feed lubricating system which is actuated and controlled by the revolution of one or more of the cutter bits; and which therefore corresponds, in functional character to the similarly actuated systems of the previously described constructions. In the third illustrative embodiment of my improvements the cutter actuated means for effecting the lubrication comprises; (1) a sleeve gear member $43^b$ which is detachably secured to the upper end of one of the side roller cutters $14^b$ (or to the adjacent extremity of the central bushing therefor); (2) an associated pinion $44^b$ that is attached to the lower end of the pump shaft $45^b$; (3) the screw pump element $46^b$ which is adapted to draw liquid from the cavity in which the cutter is revolving and discharge it into the lower end of the annular opening between the upper head section, $15^b$, and the central conduit $34^b$; and (4) the annular piston $41^b$ which receives the liquid pressure established by the action of the pump $46^b$ and transmits it to the mass of lubricant above the said piston. The lubricant is discharged from the extreme upper end of the annular chamber in the section $15^b$ through an opening $80^x$ formed in a tube 80 that surrounds the conduit $34^b$ and terminates at its lower end in a recess in the section $12^b$; from whence it is conducted to the bearings of the cutters $13^b$ by ducts $39^b$—$40^b$ (see Figs. 5 and 6), and to the journal surfaces of the cutters $14^b$, by the passage ways $57^b$—$58^b$ (see Fig. 4). In this case the upper end of the annular cavity in the head is closed off from the flushing liquid by the centering plate, 81, the packing ring, 82, and the clamp nut and washer 83; but the plate 81 is provided with an aperture 84 through which the space above the piston $41^b$ may be filled with lubricant when the head is disconnected from the drill stem $16^b$, and the packing elements 82—83 are removed.

The rate of feed to the bearings of the revolving cutters may be controlled entirely by the working pitch and the angular velocity of the screw pump $46^b$; but in order to guard against an excessive or undue accumulation of pressure in the liquid filled chamber below the piston I preferably provide a spring check valve 85 which may be adjusted to open at any desired pressure and permit of the escape of a portion of this liquid to the outside of the drill head.

The flushing liquid for the various cutter members is carried down through the central conduit $34^b$ and is discharged from the lower end thereof through four inclined passage ways; two of which ($38^b$—$38^b$) deliver their streams against the rearward and upwardly moving sides of the cutters $13^b$—$13^b$; while the other two (86—86) direct the issuing jets of liquid against the rearward and inwardly moving teeth of the side rolling bits 14—14. In all cases the flow is so directed that the tangential or oblique impingement of the water against the revolving cutter surfaces will effectually dislodge and wash away the material which is chipped out by the teeth, and keep the latter in clean and effective working condition.

It will now be obvious to those skilled in this art that the general features of my invention may be embodied in a large number of different forms of boring tool construction; and that certain features of these improvements—e. g. the system of cutter controlled lubricator feed—may be employed in conjunction with horizontal and vertical disc drills, as well as with such types of roller bit tools as I have herein shown; or may be used with such associated types as are illustrated and described in my copending application Ser. No. 442,333 filed February 3rd, 1921.

What I claim as new and desire to secure by Letters Patent is:

1. In a rotary boring tool the combination of a head, a cutting member revolvably mounted thereon, a lubricant chamber, a piston located in said chamber for separating the lubricant contained therein from flushing water contained thereabove and a pump in the chamber actuated by said cutting member for controlling the delivery of lubricant from said chamber to the bearings of said cutting member.

2. In a rotary boring tool the combination of a head, a cutting member revolvably mounted therein, a lubricant chamber associated therewith, a piston located within said lubricant chamber and separating the lubricant contained therein from flushing liquid contained therein, a pump in said chamber actuated by said cutting member for controlling the delivery of lubricant from said chamber and a check valve communicating with said chamber for limiting the effective pressure of said pump.

In testimony whereof, I have hereunto set my hand this 21st day of March, 1927.

FRANK L. O. WADSWORTH.